US012392472B2

(12) United States Patent
Cantudo et al.

(10) Patent No.: US 12,392,472 B2
(45) Date of Patent: Aug. 19, 2025

(54) MOTOR VEHICLE SIGNALING LIGHT DEVICE

(71) Applicant: VALEO VISION, Bobigny (FR)

(72) Inventors: Miguel Angel Cantudo, Martos (ES); Leandro Rodriguez, Martos (ES); Ricardo Fernandez, Martos (ES)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/721,808

(22) PCT Filed: Dec. 23, 2022

(86) PCT No.: PCT/EP2022/087726

§ 371 (c)(1),
(2) Date: Jun. 19, 2024

(87) PCT Pub. No.: WO2023/118566

PCT Pub. Date: Jun. 29, 2023

(65) Prior Publication Data

US 2025/0084978 A1 Mar. 13, 2025

(30) Foreign Application Priority Data

Dec. 26, 2021 (FR) ....................................... 2114522

(51) Int. Cl.
*F21S 43/19* (2018.01)

(52) U.S. Cl.
CPC .................................. *F21S 43/195* (2018.01)

(58) Field of Classification Search
CPC ..................................................... F21S 43/195
(Continued)

(56) References Cited

U.S. PATENT DOCUMENTS 6,261,104 B1 7/2001 Leman
7,374,426 B2 5/2008 Akamatsu
(Continued)

FOREIGN PATENT DOCUMENTS

EP 3839331 A1 * 6/2021 ........... B60Q 1/2607
JP 2001217024 A 8/2001
(Continued)

OTHER PUBLICATIONS

European Patent Office, International Search Report (with English translation) and Written Opinion of corresponding International Application No. PCT/EP2022/087726, dated May 26, 2023.
(Continued)

*Primary Examiner* — Christopher M Raabe
(74) *Attorney, Agent, or Firm* — Valeo Vision

(57) ABSTRACT

The invention provides a signaling luminous device for an automotive vehicle, including a connector intended to be connected to an electrical power supply, a first and a second PCBA assembly each with a printed circuit board, a connector receptacle disposed on the printed circuit board, and electronic components disposed on the printed circuit board that are capable of being powered via the printed circuit board, the second PCBA assembly including at least one light source among its components, wherein the connector cooperates with the connector receptacles of each of the first and second PCBA assemblies so as to electrically connect the first and second PCBA assemblies such that they can be powered by the electrical power supply.

9 Claims, 6 Drawing Sheets

(58) Field of Classification Search
USPC .......................................................... 313/543
See application file for complete search history.

(56) References Cited

U.S. PATENT DOCUMENTS

| | | | | |
|---|---|---|---|---|
| 7,944,708 | B2 | 5/2011 | Lin | |
| 2024/0107672 | A1 * | 3/2024 | Krick .................... | F21S 41/153 |

FOREIGN PATENT DOCUMENTS

| | | | |
|---|---|---|---|
| JP | 2007335575 | A | 12/2007 |
| JP | 2015035546 | A | 2/2015 |
| JP | 2021118120 | A | 8/2021 |
| KR | 102313643 | B1 | 10/2021 |

OTHER PUBLICATIONS

Japan Patent Office, Office Action (with English translation) of corresponding Japanese Application No. 2024-538775, dated Jun. 17, 2025, 14 pages.
Japan Patent Office, Search Report (with English translation) of corresponding Japanese Application No. 2024-538775, dated Jun. 18, 2025, 31 pages.

* cited by examiner

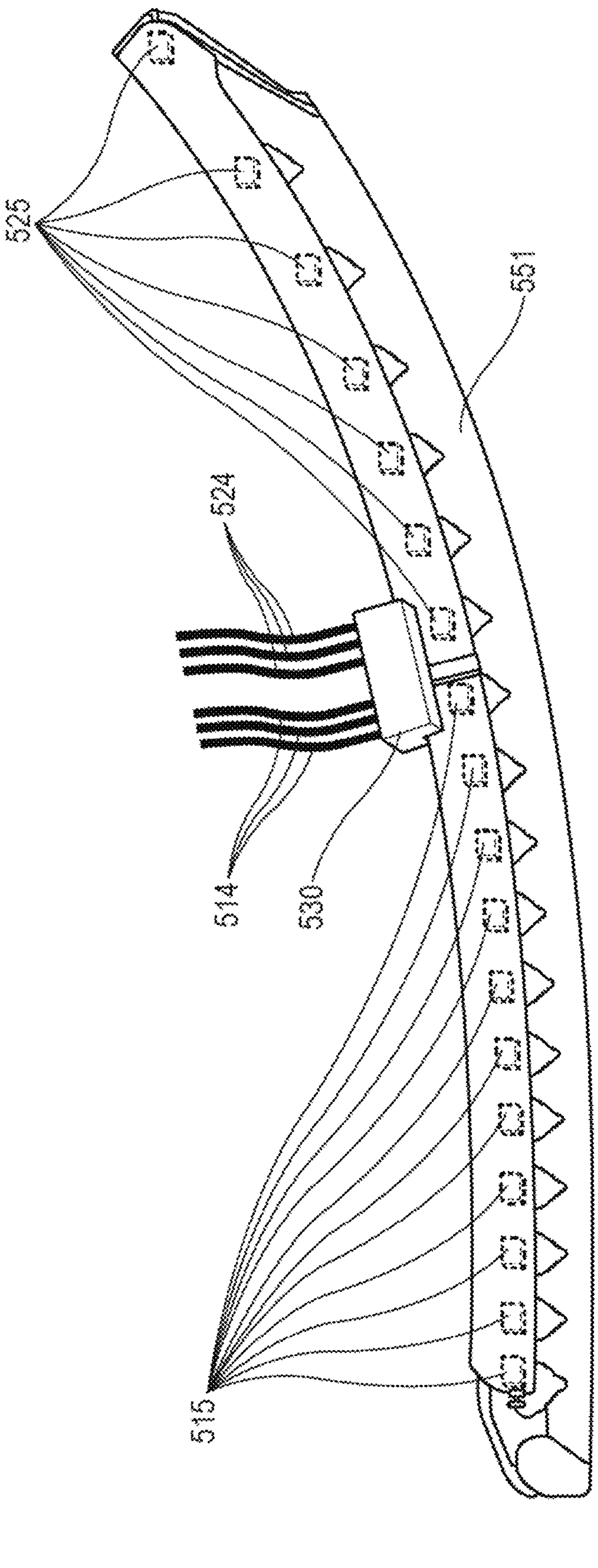
[Fig.5]

MOTOR VEHICLE SIGNALING LIGHT DEVICE

TECHNICAL FIELD

The technical field of the invention is automotive lighting, in particular signaling devices for an automotive vehicle.

BACKGROUND OF THE INVENTION

A luminous device for an automotive vehicle comprising a printed circuit board, also called PCB, having an elongate form, on which light sources, for example 50 light sources, are mounted arranged regularly in one or two rows along the printed circuit board is known. In addition, in order to meet styling requirements, the printed circuit board adopts a curved form. Such a device is expensive to produce due to the length of the printed circuit board, and due to the curvature of said board which renders the process of cutting out several printed circuit boards in a standard rectangular shape less effective, in that a number of zones of the rectangular printed circuit board to be cut out are not used.

Another luminous device in which two different signaling functions are realized on the basis of sources mounted, for one function, on a first printed circuit board and, for the second function, on a second printed circuit board is known. In order to supply this luminous device with electricity, a first cable harness at the first printed circuit board is connected to an electrical power supply, and the second printed circuit board is connected to an electrical power supply. Such a luminous device is expensive to produce because it comprises a harness and a printed circuit board harness connector.

SUMMARY OF THE INVENTION

The object of the invention is to allow several printed circuit boards to be used in a luminous device without increasing the price.

To this end, the invention provides a signaling luminous device for an automotive vehicle, comprising:

- a connector intended to be connected to an electrical power supply,
- a first and a second PCBA assembly each comprising
- a printed circuit board,
- a connector receptacle disposed on the printed circuit board, and
- electronic components disposed on the printed circuit board that are capable of being powered via said printed circuit board,
- the second PCBA assembly comprising at least one light source among its components,
- wherein said connector cooperates with the connector receptacles of each of the first and second PCBA assemblies so as to electrically connect the first and second PCBA assemblies such that they can be powered by said electrical power supply.

The PCBA assemblies (according to the abbreviation known to those skilled in the art, Printed Circuit Board Assembly) are made up of a printed circuit board on which other elements, such as electronic components, connectors, etc., are mounted.

A connector is understood to mean a device provided with a rigid (in relation to flexible cables) contact support supporting all the contacts of the connector. Likewise, a connector receptacle comprises a rigid contact support supporting all its contacts. This makes it possible, in a single connection operation, to connect at least a plurality of the contacts of the connector to all the contacts of at least one connector receptacle, so as to ensure electrical continuity across said contacts. The prior art contains numerous connectors, for example card edge connectors or pin connectors.

The electronic components may notably include control circuits and light sources.

It will be appreciated that the connector cooperates with the connector receptacles of the first and second PCBA assemblies such that it extends on either side of a space between the two PCBA assemblies.

Thus, it is possible for each of the assemblies to be connected with the aid of a single connector.

Advantageously, the PCBAs are coplanar, within a coplanarity tolerance that is sufficient to ensure good cooperation between the connector and the two connector receptacles.

Advantageously, the PCBA assemblies extend edge to edge. This is particularly relevant for improving the compactness of the luminous device.

Advantageously, the first PCBA assembly has an edge and second PCBA assemblies have an edge capable of cooperating with one another, in such a way as to leave a minimal space between them. In one non-limiting example, this edge is straight.

Advantageously, the connector comprises an arrangement of contacts disposed in one or two rows, and the receptacles of the first and second assemblies each comprise an arrangement of contacts such that the total number of contacts of the receptacles is lower than the number of contacts of the connector, such that at least one contact of the connector is left vacant between the connector receptacles of the first and second PCBA assemblies.

Advantageously, the PCBA assemblies are fastened to a common support. For example, this edge may be constituted by the housing of the luminous device, or by a mask or a trim of the luminous device.

Advantageously, the PCBA assemblies are fastened to a common support formed in one piece with a reflector. Thus, optimal positioning of the PCBA assemblies relative to one another is obtained, at the same time as optimal positioning of the at least one light source of the second PCBA assembly relative to the reflector.

Advantageously, the common support is a radiator.

Advantageously, the connector is what is known to those skilled in the art as a card edge connector. This type of connector may also be called. Conventional card edge connectors comprise a row of contacts formed by clamp elements, said elements ensuring, by way of their elasticity, contact with a connector receptacle constituted by a contact zone formed by a track of a printed circuit board, generally provided with a tin-based or nickel-gold-based coating. Card edge connectors do not require mounting of receptacles that have to be mounted on the printed circuit boards, do not create any stresses due to hyperstaticity on the PCBA assemblies, and additionally have the advantage of being able to be assembled by hand after the PCBA assemblies have been assembled on a support.

When the connector is a card edge connector, it is advantageous for the printed circuit boards to form, on either side of the connector, retention means, preferably retention means capable of deforming elastically under the action of an operator inserting the connector. For example, the retention means may include arms capable of snap-fastening the connector when the latter is inserted between the arms by the operator.

Advantageously, the connector is a pin-type connector. It will be appreciated that the receptacles of the assemblies are then pin connector receptacles. A preferred embodiment of the invention is to have two separate connector receptacles; however, in the case of a pin connector, the connector receptacle disposed on the first PCBA assembly and the connector receptacle disposed on the second PCBA assembly may advantageously be the same connector receptacle. Thus, a conventional connector receptacle may be used, by mounting it on the two PCBA assemblies.

Advantageously, the first PCBA assembly comprises a control circuit capable of controlling the at least one light source of the second PCBA assembly, and the connector comprises electrical links capable of connecting said control circuit to said light source.

Advantageously, the first PCBA assembly comprises at least one light source capable of contributing to at least one signaling function of the luminous device, and the second PCBA assembly comprises a light source capable of emitting a different light to that emitted by the light source of the first assembly, so as to contribute to a separate luminous function. Thus, light sources corresponding to different heat dissipations may be arranged on light sources.

Advantageously, the first PCBA assembly comprises an arrangement of light sources capable of contributing to at least one signaling function of the luminous device, and the second PCBA assembly comprises a row of light sources of the same type that are capable of contributing to the same luminous function. Advantageously, the arrangement of light sources is a row of light sources that may extend along a straight or curved line, depending on the styling constraints.

Advantageously, the light sources are light-emitting diodes, also called LEDs.

BRIEF DESCRIPTION OF DRAWINGS

FIG. 5 is a partial view of a luminous device showing PCBA assemblies assembled on a support formed by a reflector.

DETAILED DESCRIPTION OF THE INVENTION

Figure 1A:
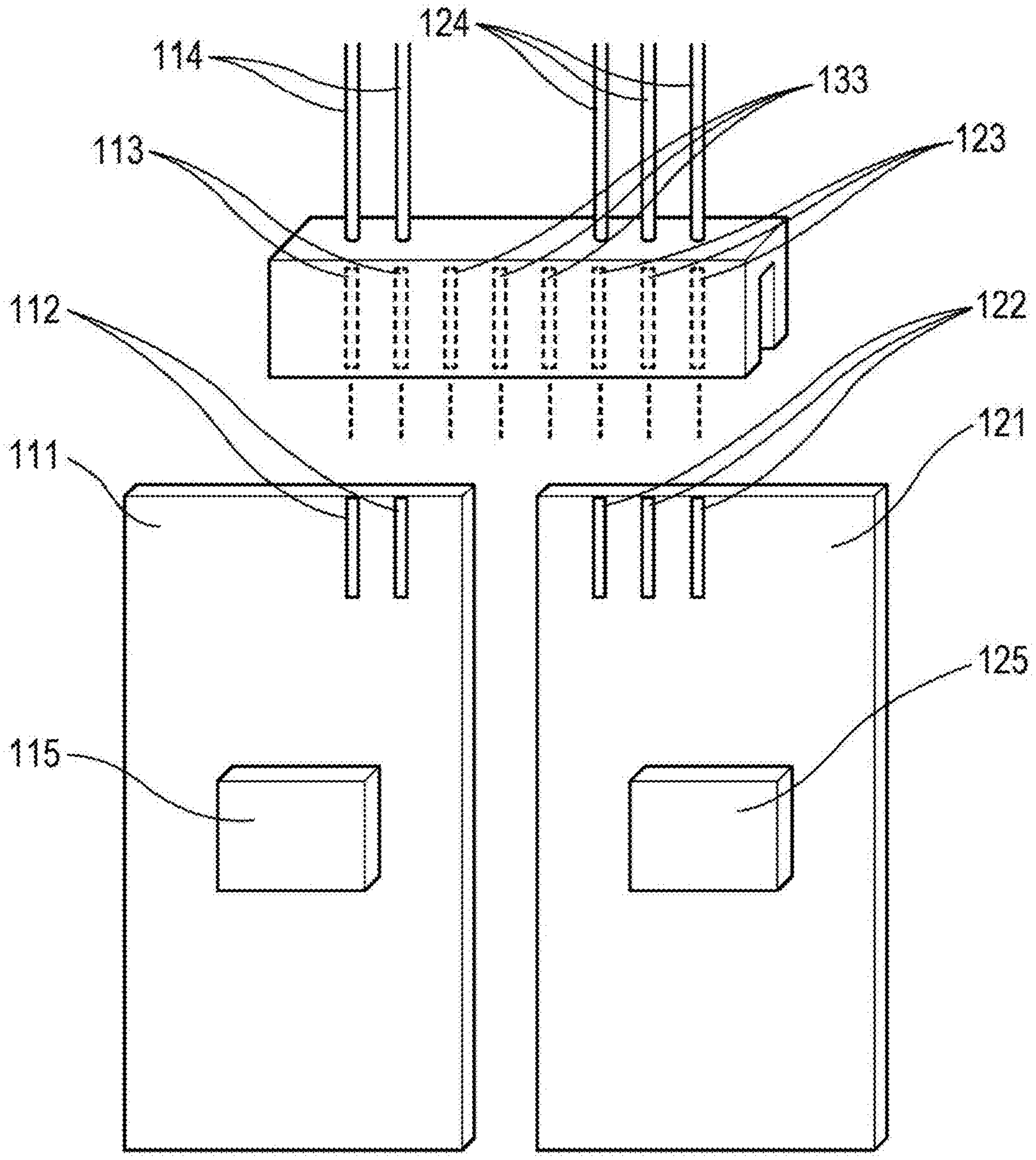
FIG. 1A is a partial view of a luminous device showing PCBA assemblies and a demounted card edge connector.

FIG. 1A is a partial view of a luminous device comprising a first PCBA assembly 111 on which an LED 115 is mounted and a second PCBA assembly 121 on which an LED 125 is mounted. The device comprises a card edge connector, shown in a non-assembled state. The first and second PCBA assemblies are provided with receptacles 112 and 122 constituted of tracks allowing electrical contact with the contacts 113 and 123, respectively, of the card edge connector. Said tracks are covered with a tin-based coating preventing wear thereof. Wires 114, 124 respectively connect the PCBA assemblies 111 and 121 to an electrical power supply.

Figure 1B:
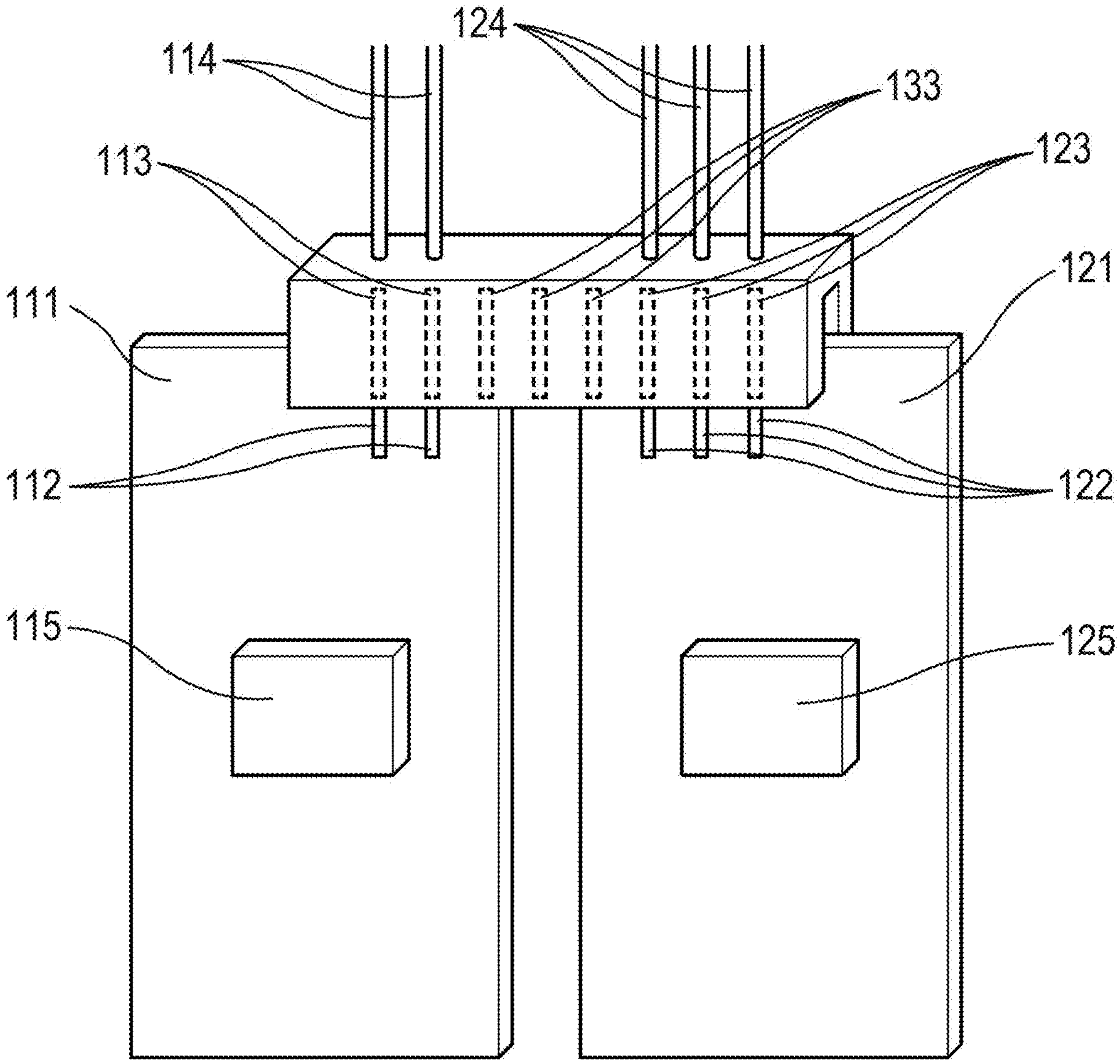
FIG. 1B is a partial view of a luminous device showing PCBA assemblies and a demounted card edge connector.

FIG. 1B is a partial view of the same luminous device in which the PCBA assemblies are assembled with the card edge connector. It is noted that several contacts 133 of the card edge connector are left free, such that contacts too close to the edge of the board are avoided, by employing standard connectors whose spacing between the contacts is regular.

Figure 2:
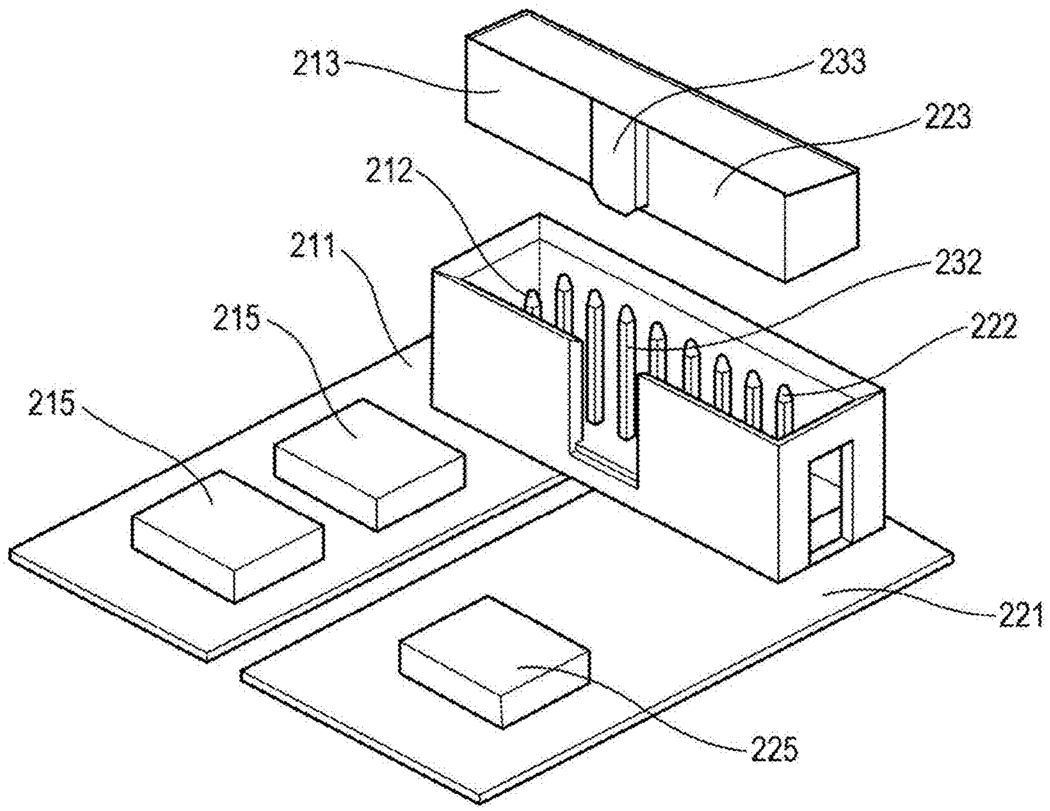
FIG. 2 is a partial view of a luminous device showing PCBA assemblies comprising a pin connector.

FIG. 2 is a partial view of a luminous device showing PCBA assemblies 211, 221 on which LEDs 215, 225 are mounted. The PCBA assemblies 211, 221 are connected to one another by a pin connector. The pin connector is mounted simultaneously on the two printed circuit board assemblies and comprises pins 212, 232, 222 that cooperate respectively with pin receptacle contacts 213, 233, 223 connected to wires (not shown). The pins 232 covering the space between the PCBs are left free such that contacts too close to the edge of the boards are avoided. The use of such a connector secures the printed circuit boards in such a way as to create an easily manipulable assembly. It is particularly suitable for PCBA assemblies that do not have a marked elongation, for example PCBA assemblies having dimensions less than two times greater in one direction than in another.

Figure 3:
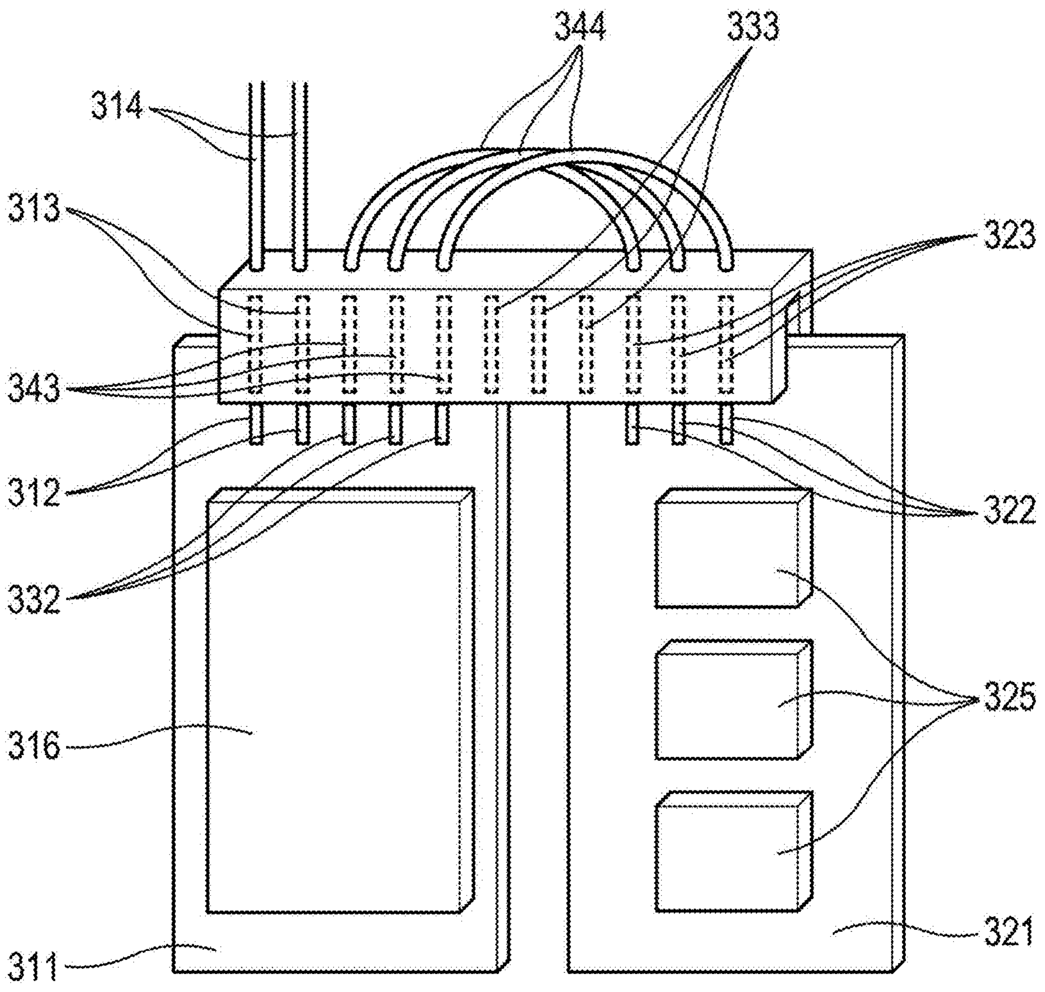
FIG. 3 is a partial view of a luminous device showing PCBA assemblies comprising, for the first, a circuit for controlling LEDs and, for the second, LEDs.

FIG. 3 is a partial view of a luminous device showing PCBA assemblies 311, 321 comprising, for the first, a circuit for controlling LEDs 316 and, for the second, LEDs 325. The first PCBA assembly 311 comprises a printed circuit board with a large number of circuit layers allowing the realization of more complex circuits, adapted to the use of complex control circuits. The second PCBA assembly 321 comprises a simpler and less expensive printed circuit board with one or two layers. According to the same principle seen above, the first and second PCBA assemblies are provided with receptacles 312 and 322 constituted of tracks allowing electrical contact with the contacts 313 and 323, respectively, of the card edge connector. Said tracks are covered with a tin-based coating preventing wear thereof. Several contacts 133 of the card edge connector are left free. Wires 314 connect the PCBA assembly 311 to an electrical power supply. The connector in this case comprises connection elements for connecting several contacts of the connector to one another so as to connect tracks of the printed circuit board of the first assembly to tracks of the printed circuit board of the second assembly. In the present case, they are wires 344 here, but any other type of connection elements is conceivable. The use of wires allows standard card edge connectors to be used, representing a substantial cost saving.

Figure 4:
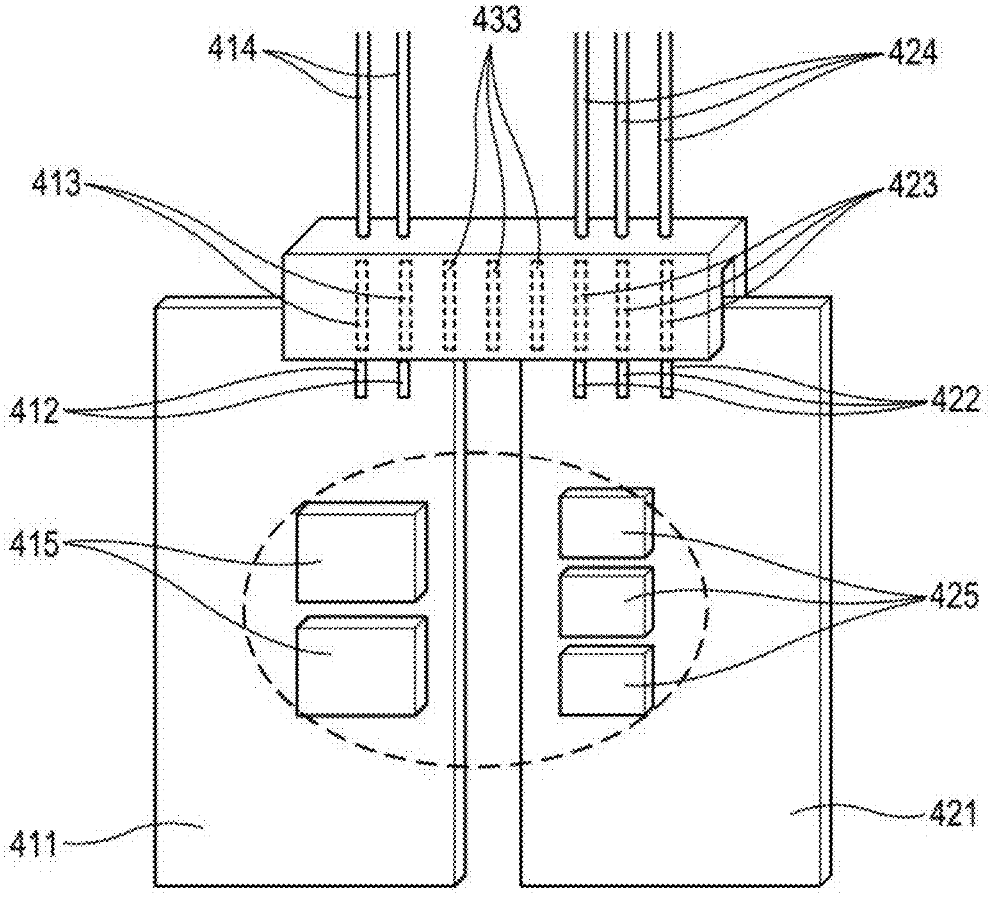
FIG. 4 is a partial view of a luminous device showing PCBA assemblies, of which the first comprises LEDs capable of emitting white light, intended to contribute to a first signaling function, and the second comprises LEDs capable of emitting amber light, intended to contribute to a first signaling function.

FIG. 4 is a partial view of a luminous device in which the PCBA assemblies are mounted so as to create a grouping of LEDs 415 and 425 on either side of a space that separates them, so as to allow light sources to be concentrated in a restricted zone corresponding to an inlet of a light guide, in particular a light guide of cylindrical form. According to the same principle seen above, the first and second PCBA assemblies are provided with receptacles 412 and 422 constituted of tracks allowing electrical contact with the contacts 413 and 423, respectively, of the card edge connector. Said tracks are covered with a tin-based coating preventing wear thereof. Several contacts 433 of the card edge connector are left free. The printed circuit board of the first assembly 411 comprises light sources 415 capable of emitting light of a first color and of performing a first signaling function, and the printed circuit board of the second assembly 421 comprises light sources 425 capable of emitting light of a second color and of performing a second signaling function. Thus, it is possible to use printed circuit boards adapted to the heat dissipation needs of each of the functions, while still keeping the light sources in a fairly restricted zone corresponding to the inlet of a light guide. For example, LEDs corresponding to a function that consumes more energy could be assembled on a printed circuit board of the insulated metal substrate (known to those skilled in the art under the abbreviation IMS) type, whereas LEDs corresponding to a function that dissipates less energy could be mounted on a less expensive printed circuit board of the FR4 type, thus avoiding additional costs linked to the use of an excessively large surface area of an insulated metal substrate printed circuit board. When at least one of the functions leads to a particularly high energy consumption, the common support is advantageously a radiator for dissipating heat.

FIG. 5 is a partial view of a luminous device, integrated into a headlamp unit of an automotive vehicle, showing PCBA assemblies assembled on a support formed by a reflector 551. The connector 530 connects the PCBAs to a power supply via the wires 514, 524. The PCBA assemblies in FIG. 5 each comprise an arrangement of LEDs 515, 525 forming a row along a curved line, and thus enabling realization of a signaling function, such as a function for indicating a change of direction. It is noted in this figure that the integration of the luminous device into an automotive vehicle headlamp is made easy by the compactness of the solution.

The invention should not be regarded as being limited to the embodiments specifically given in this document by way of non-limiting examples, and extends, in particular, to any equivalent means and to any technically operative combination of these means; for example, an embodiment implementing a first assembly comprising a printed circuit board on which a control circuit and LEDs intended to contribute to a first function are mounted, and a second assembly comprising light sources intended to contribute to a second function; LEDs of white and amber, white and red, or white and amber and red colors; etc. Thus, the features, the variants and the different embodiments of the invention may be associated with one another, in various combinations, provided that they are not mutually exclusive or incompatible.

What is claimed is:

1. A signaling luminous device for an automotive vehicle, comprising:

a connector configured to be connected to an electrical power supply;

a first and a second PCBA assembly each including a printed circuit board, a connector receptacle disposed on the printed circuit board, and electronic components disposed on the printed circuit board and capable of being powered via the printed circuit board;

the second PCBA assembly including at least one light source among the electronic components;

wherein the first and second PCBA assembly are fastened to a common support, the common support formed in one-piece with a reflector; and wherein the connector cooperates with the connector receptacles of each of the first and second PCBA assemblies so as to electrically connect the first and second PCBA assemblies such that they can be powered by an electrical power supply.

2. The device of claim 1, wherein the printed circuit board of the first assembly is coplanar with the printed circuit board of the second assembly, and in that the PCBA assemblies extend edge to edge.

3. The device of claim 1, wherein the connector includes an arrangement of contacts disposed in one or two rows, and in that the receptacles of the first and second assemblies each include an arrangement of contacts such that the total number of contact points of the receptacles is lower than the number of contacts of the connector, such that at least one contact point of the connector is left vacant between the connector receptacles of the first and second PCBA assemblies.

4. The device of claim 1, wherein the connector is a card edge connector.

5. The device of claim 1, wherein the connector is a pin connector.

6. The device of claim 5, wherein the connector receptacle disposed on the first PCBA assembly and the connector receptacle disposed on the second PCBA assembly are the same connector receptacle.

7. The device of claim 1, wherein the first PCBA assembly includes a control circuit capable of controlling the at least one light source of the second PCBA assembly, and in that the connector includes electrical links capable of connecting the control circuit to the at least one light source.

8. The device of claim 1, wherein the first PCBA assembly includes at least one light source capable of contributing to at least one signalling function of the luminous device, and in that the second PCBA assembly includes a light source capable of emitting a different light to that emitted by the light source of the first assembly, so as to contribute to a separate luminous function.

9. The device of claim 1, wherein the first PCBA assembly includes an arrangement of light sources capable of contributing to at least one signalling function of the luminous device, and in that the second PCBA assembly includes a row of light sources of the same type that are capable of contributing to the same luminous function.

* * * * *